(12) United States Patent
Kaushik (10) Patent No.: US 11,541,317 B2
(45) Date of Patent: Jan. 3, 2023

(54) AUTOMATED WEAPON SELECTION FOR NEW PLAYERS USING AI

(71) Applicant: Sony Interactive Entertainment Inc., Tokyo (JP)

(72) Inventor: Lakshmish Kaushik, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 62 days.

(21) Appl. No.: 16/783,905

(22) Filed: Feb. 6, 2020

(65) Prior Publication Data

US 2021/0245061 A1 Aug. 12, 2021

(51) Int. Cl.
*A63F 13/67* (2014.01)
*A63F 13/798* (2014.01)
*A63F 13/69* (2014.01)

(52) U.S. Cl.
CPC ............ *A63F 13/798* (2014.09); *A63F 13/69* (2014.09)

(58) Field of Classification Search
None
See application file for complete search history.

(56) References Cited

U.S. PATENT DOCUMENTS

| | | | | |
|---|---|---|---|---|
| 6,736,724 B1* | 5/2004 | Erikawa | .................. | A63F 13/10 463/7 |
| 8,622,839 B1* | 1/2014 | McKenzie | .............. | H04L 67/42 463/42 |
| 9,672,190 B1* | 6/2017 | Yu | ............................ | G07F 17/32 |
| 10,065,118 B1* | 9/2018 | Kamath | ................ | G06F 3/0484 |
| 10,617,945 B1* | 4/2020 | George | .................... | A63F 13/23 |
| 2007/0191096 A1* | 8/2007 | Tanaka | .................... | A63F 13/00 463/31 |
| 2008/0194333 A1* | 8/2008 | Zalewski | ................ | A63F 13/12 463/42 |
| 2008/0266250 A1* | 10/2008 | Jacob | ..................... | A63F 13/67 345/156 |
| 2009/0011838 A1* | 1/2009 | Miyamoto | .............. | A63F 13/75 463/43 |
| 2009/0063463 A1* | 3/2009 | Turner | .................... | A63F 13/80 |
| 2010/0041475 A1* | 2/2010 | Zalewski | ................ | A63F 13/47 463/30 |
| 2011/0078571 A1* | 3/2011 | Asbahr | ................. | A63F 13/426 715/716 |

(Continued)

FOREIGN PATENT DOCUMENTS

WO   WO-2018127704 A1 *   7/2018   ............. A63F 13/35

OTHER PUBLICATIONS

Arkham, Halo 5 Weapon Respawn Times, Nov. 7, 2015, https://www.youtube.com/watch?v=9RKhE-u_4Ng, Time 0:00-6:54 (Year: 2015).*

(Continued)

*Primary Examiner* — Tramar Harper
(74) *Attorney, Agent, or Firm* — John L. Rogitz (57) ABSTRACT

An inexperienced computer simulation player is assisted in playing the simulation by identifying in previously-played simulations successful players in terms of simulation play. The virtual weapons selected by those players are identified and a recommendation of the weapon presented to the inexperienced player of the computer simulation.

20 Claims, 4 Drawing Sheets

(56) References Cited

U.S. PATENT DOCUMENTS

| | | | |
|---|---|---|---|
| 2012/0122577 A1* | 5/2012 | Aronzon | A63F 13/335 463/36 |
| 2012/0202596 A1* | 8/2012 | Narita | A63F 13/426 463/36 |
| 2013/0065692 A1* | 3/2013 | Aronzon | A63F 13/213 463/42 |
| 2013/0085345 A1 | 4/2013 | Geisner et al. | |
| 2014/0187323 A1* | 7/2014 | Perry | A63F 13/24 463/31 |
| 2014/0357352 A1 | 12/2014 | Luchene | |
| 2014/0370948 A1* | 12/2014 | Noh | G07F 17/32 463/2 |
| 2017/0259177 A1* | 9/2017 | Aghdaie | A63F 13/35 |
| 2017/0282063 A1* | 10/2017 | Krishnamurthy | A63F 13/5375 |
| 2017/0340972 A1 | 11/2017 | Seo | |
| 2018/0001205 A1* | 1/2018 | Osman | A63F 13/5375 |
| 2018/0001206 A1* | 1/2018 | Osman | A63F 13/5375 |
| 2018/0243656 A1* | 8/2018 | Aghdaie | A63F 13/79 |
| 2018/0256982 A1* | 9/2018 | Kuneida | A63F 13/85 |
| 2018/0280802 A1* | 10/2018 | Stroud | A63F 13/79 |
| 2018/0290060 A1* | 10/2018 | Noss | A63F 13/46 |
| 2019/0060759 A1* | 2/2019 | Krishnamurthy | A63F 13/69 |
| 2019/0217203 A1* | 7/2019 | Ryan | A63F 13/67 |
| 2019/0232168 A1* | 8/2019 | Benedetto | A63F 13/422 |
| 2019/0329138 A1* | 10/2019 | Panesar | A63F 13/216 |
| 2019/0329139 A1* | 10/2019 | Di Giacomo Toledo | A63F 13/352 |
| 2019/0358545 A1* | 11/2019 | Aghdaie | A63F 13/5375 |
| 2020/0122043 A1* | 4/2020 | Benedetto | A63F 13/69 |
| 2020/0155945 A1* | 5/2020 | Tran | A63F 13/798 |
| 2020/0206638 A1* | 7/2020 | Nakano | A63F 13/75 |
| 2020/0269136 A1* | 8/2020 | Gurumurthy | G06N 20/00 |
| 2020/0289943 A1* | 9/2020 | Rico | G06K 9/6256 |

OTHER PUBLICATIONS

International Search Report and Written Opinion dated May 19, 2021 from the counterpart PCT application PCT/US21/15047.

* cited by examiner

AUTOMATED WEAPON SELECTION FOR NEW PLAYERS USING AI

FIELD

The application relates generally to technically inventive, non-routine solutions that are necessarily rooted in computer technology and that produce concrete technical improvements.

BACKGROUND

As understood herein, players of computer simulations such as computer games are often tasked with selecting a virtual weapon for use in the game. As further understood herein, inexperienced players often do not make the optimum choice, leading to frustration.

SUMMARY

Accordingly, a system includes at least one computer simulation controller and at least one computer simulation source configured to receive input from the computer simulation controller to control presentation of a computer simulation presented on at least one display. The computer simulation source includes at least one processor and at least one storage accessible to the processor with instructions executable by the processor to identify, in at least one previously-played simulation, at least a first successful play in terms of simulation play. The instructions are executable to identify at least one virtual implement used during the successful play; and present a recommendation of the implement to a second player of the computer simulation.

The computer simulation source may include a network server communicating with the computer simulation controller over a computer network, and/or a computer game console communicating directly with the computer simulation controller.

In some examples, the instructions are executable to identify the virtual implement at least in part using at least one machine learning algorithm processing images of the previously-played simulation. In non-limiting embodiments the instructions are executable to identify the second player as being an inexperienced player in need of the recommendation at least in part using at least one machine learning algorithm processing information pertaining to the second player. The virtual implement may include a virtual weapon or a virtual vehicle. The instructions may be executable to recommend to the second player a hand in which to wield the virtual implement.

In another aspect, a method includes identifying a player of a computer simulation as requiring assistance in playing the simulation, and responsive to identifying the player as requiring assistance, present a recommendation on at least one display to the player regarding simulation play.

In non-limiting examples of the method, the recommendation may be visual and/or audible. In some embodiments, identifying the player as requiring assistance may include receiving a selection of inexperienced from at least one user interface (UI). In other embodiments identifying the player as requiring assistance can include analyzing at least some simulation commands input from a simulation controller.

In examples, the recommendation can include a recommendation as to an implement to use, such as a virtual weapon or a virtual vehicle. The recommendation may include at least one instruction to proceed to an emulated destination in the simulation.

In another aspect, an apparatus includes at least one computer storage that is not a transitory signal and that in turn includes instructions executable by at least one processor to identify a player of a computer simulation as having a first characteristic, and responsive to identifying the player as having the first characteristic, provide audio and/or video help in playing the simulation to the player using at least one display.

The details of the present application, both as to its structure and operation, can best be understood in reference to the accompanying drawings, in which like reference numerals refer to like parts, and in which:

DETAILED DESCRIPTION

This disclosure relates generally to computer ecosystems including aspects of consumer electronics (CE) device networks such as but not limited to computer simulation networks such as computer game networks as well as standalone computer simulation systems. A system herein may include server and client components, connected over a network such that data may be exchanged between the client and server components. The client components may include one or more computing devices including game consoles such as Sony PlayStation® or a game console made by Microsoft or Nintendo or other manufacturer virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be a single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Figure 1:
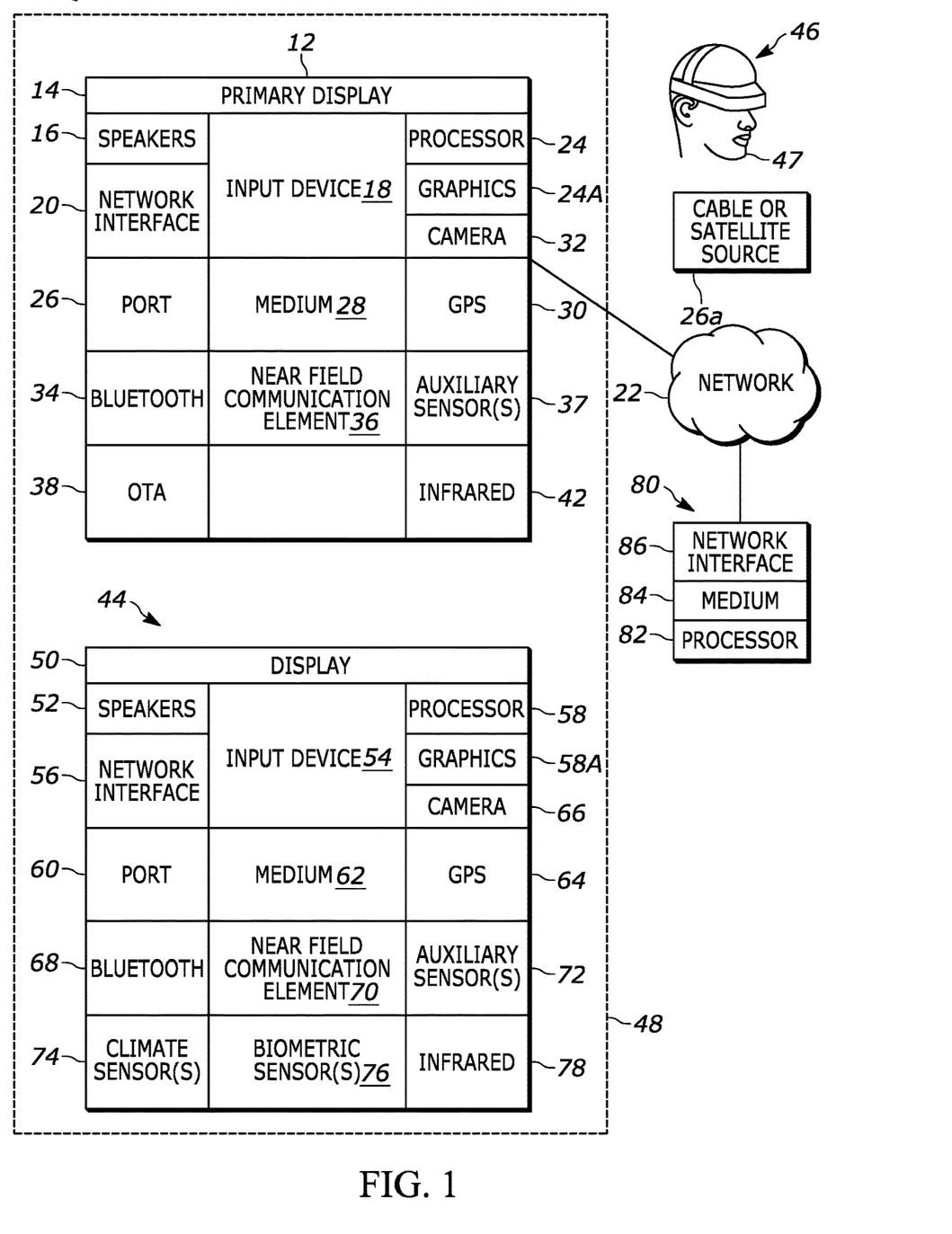
FIG. 1 is a block diagram of an example system including an example in accordance with present principles.

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24 including. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignation purposes described further below. The source 26a when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as a VR headset worn by a player 47 as shown. In the example shown, only two CE devices 44, 46 are shown, it being understood that fewer or greater devices may be used. For example, principles below discuss multiple players 47 with respective headsets communicating with each other during play of a computer game sourced by a game console to one or more AVD 12.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller, and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12 and/or a game console, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm", and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

The methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

Figure 2:
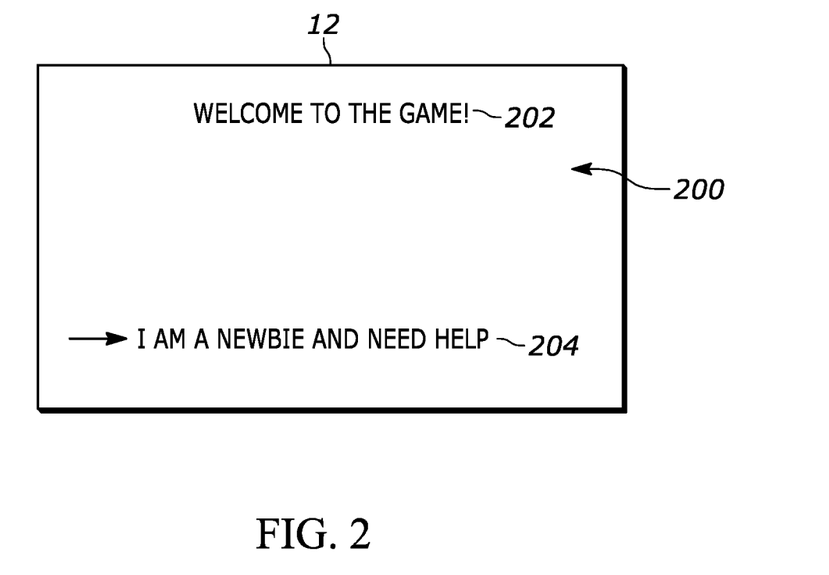
FIG. 2 is a screen shot of an example user interface (UI) enabling a simulation player to indicate whether he is inexperienced.

Now referring to FIG. 2, a user interface (UI) 200 is shown that may be presented on, e.g., the display 12 of FIG. 1 to a player of a video simulation such as a video game. The simulation system may include some or all of the components shown in FIG. 1 and described above.

The UI 200 may be presented upon starting a computer simulation or based on some other trigger. As shown, the UI 200 may include a welcome message 202 and at least one selector 204 selectable by the player to indicate that the player is unfamiliar with or otherwise inexperienced in playing the computer simulation. Such a player may be referred to colloquially as a "newbie". Note that the UI 200 may be presented audibly, so that a conversationalist program can address the player with questions to determine whether the player is a "newbie".

Figure 3:
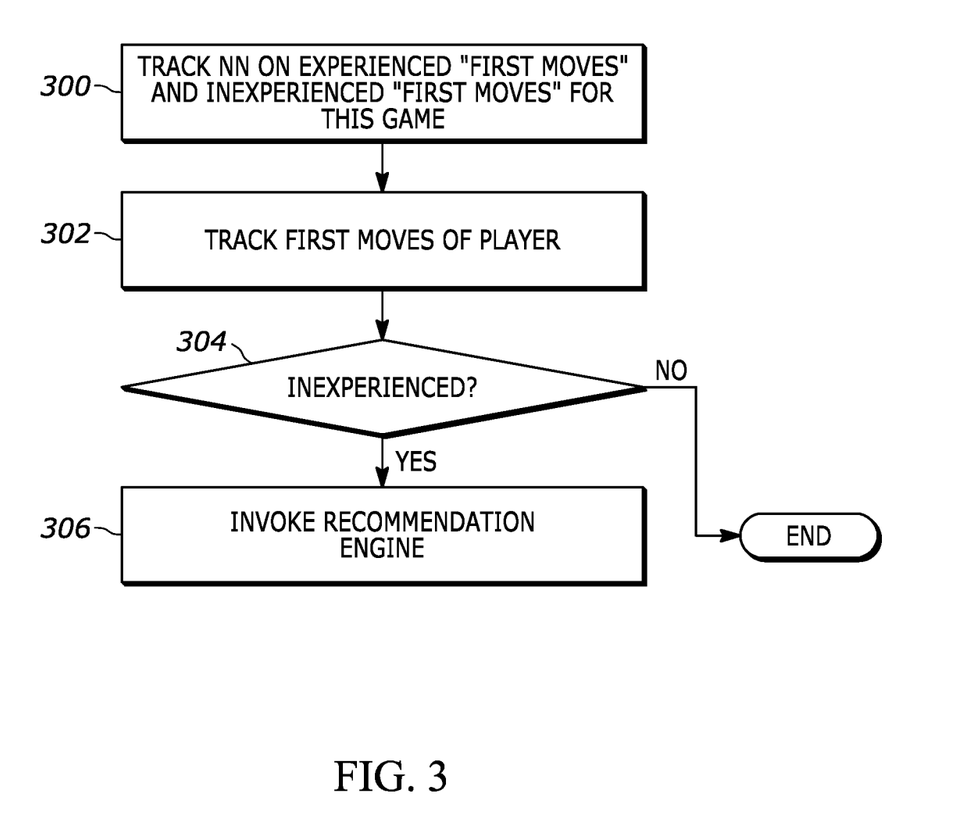
FIG. 3 is a flow chart of example logic for identifying based on game play whether a player is inexperienced.

In lieu of or in addition to allowing the player to indicate that he or she is a "newbie", FIG. 3 illustrates example logic to automatically determine that the player is inexperienced. Commencing at block 300, one or more neural networks (NN) such as but not limited convolutional NNs are trained on ground truth prior simulation history for both experienced and inexperienced players. The simulation history may be obtained using stored records of player input commands to, e.g., simulation controllers. Or, the simulation history may be obtained by analyzing recorded video of completed simulations. "Experienced" players are those who met a success threshold in playing the prior simulations, such as playing for greater than a threshold period before the simulation is terminated (due to, e.g., the player being "killed"). Other success thresholds may be achieving a threshold number of simulation points, or achieving a threshold level of simulation complexity, etc. "Inexperienced" players are those who fail to meet the "experienced" threshold or who fail to meet thresholds below the "experienced" threshold, meaning that if desired a significant gap may be established during training between the ability of experienced players and inexperienced players.

During training, "first moves" of both experienced and inexperienced players may be learned for any particular simulation. This is but one example of a detailed attribute of successful simulation play, and it recognizes that one goal is to help inexperienced players to survive for some period into a new simulation instead of being terminated early in simulation play. By learning the initial inputs successful players make to game controllers while playing past simulations, recommendations to "newbies" can be better tailored to allow the newbies to enjoy a new simulation longer than they otherwise would. Further, by learning the first moves of players who lacked the requisite degree of success, identification of "newbies" is facilitated.

Once the NN has been trained, it may be employed at block 302 to track the first moves of a player of a current simulation. If the first moves indicate that the player is inexperienced at decision diamond 304, a recommendation engine is invoked at block 306. Otherwise, the logic ends.

Figure 4:
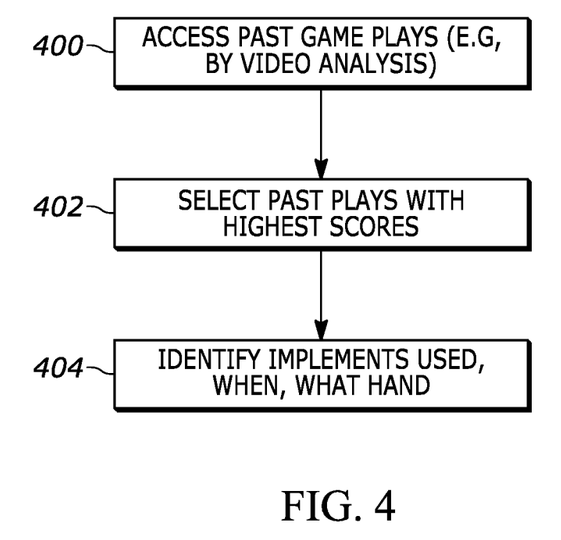
FIGS. 4 and 5 are flow charts of example logic for recommending implements and actions consistent with present principles.
Figure 5:
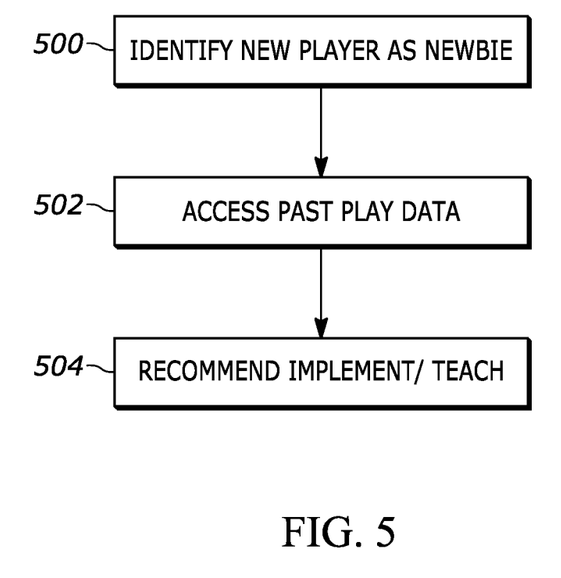

FIGS. 4 and 5 illustrate example logic for assisting an inexperienced player or "newbie" once a player has been identified as such. At block 400 of FIG. 4, the above-discussed histories of past plays of the simulation are accessed and the most successful plays selected at block 402. Proceeding to block 404, using image analysis on the video of the past successful plays or using records of inputs made by players of the past successful plays or other means, the implements selected and used by the players, including virtual weapons, virtual vehicles, and the hand with which virtual weapons were wielded are identified.

Other attributes of successful plays also may be identified. For example, for every frame or simulation segment or chapter, not only the virtual weapon used but also player emulated movement through the emulated simulation space may be identified. In this way, the "newbie" can be assisted not only to get past the first chapter or segment of the simulation but also follow-on chapters or segments.

FIG. 5 illustrates logic for recommending weapons or other hints to a player who has been identified as a newbie. Commencing at block 500, the player is identified as a newbie according to principles above. Moving to block 502 the past successful play information identified in FIG. 4 is accessed and then recommendations are made on a visual and/or audible and/or tactile display to the newbie player as the newbie plays the simulation.

The recommendations may take multiple forms. In its simplest form a recommendation might be a message to select a particular weapon. The recommendation might further describe what emulated hand the weapon should be held in. The recommendation might suggest a particular virtual vehicle or other implement. The recommendation might provide a ranked list of weapons to use, from best to worst. The recommendation might be an instruction to switch one weapon for another or it might merely hint at the correct weapon. For example, if the correct weapon is a sword, the recommendation might be to select the best cutting tool.

Figure 6:
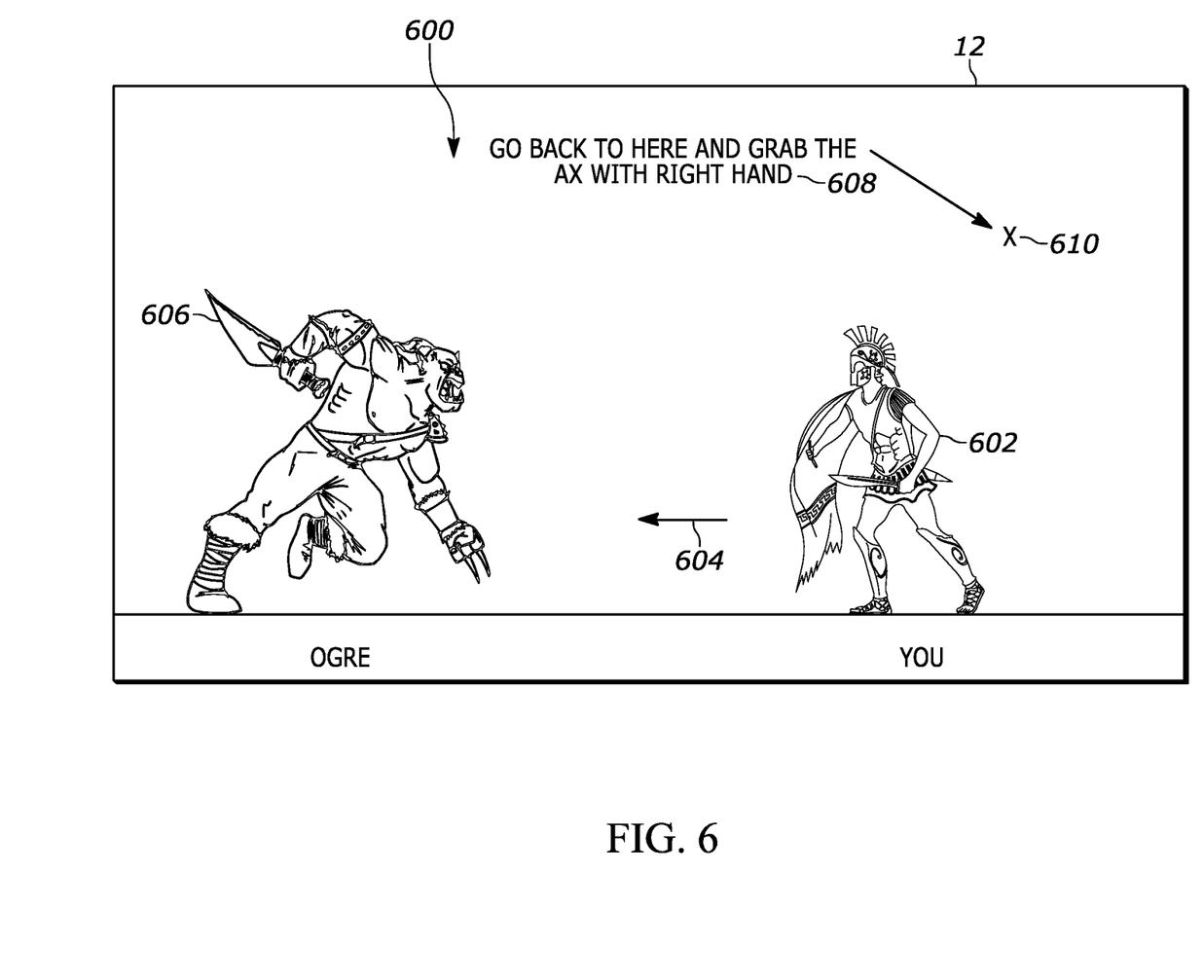
FIG. 6 is a screen shot of an example recommendation screen during simulation play.

FIG. 6 illustrates an example of a recommendation to a newbie using text and graphics, it being understood that audio and haptic feedback also or alternatively may be provided. As shown, a UI 600 may be presented showing the player's character 602 and if desired an indication 604 of the direction the player's character 602 is moving. In the non-limiting example of FIG. 6, the player's character 602 is moving toward danger 606, in this case, an ogre who may or may not be hidden from the player.

The recommendation engine described above accordingly presents a message 608 to obtain a virtual weapon that the system has learned to be an effective tool during past successful plays of the simulation, in the example shown, an ax. Not only does the recommendation 608 identify the virtual implement to be used, it also indicates at 610 the location to which the player's character 602 must return to obtain the implement.

It will be appreciated that whilst present principals have been described with reference to some example embodiments, these are not intended to be limiting, and that various alternative arrangements may be used to implement the subject matter claimed herein.

What is claimed is:

1. A system comprising:
    at least one computer simulation controller;
    at least one computer simulation source configured to receive input from the computer simulation controller to control presentation of a computer simulation presented on at least one display, the computer simulation source comprising at least one processor programmed with instructions to:
    identify, in at least one previously-played simulation, at least a first successful play in terms of simulation play by a first player at least in part by analyzing recorded video of the at least one previously-played simulation using image analysis on the recorded video of the at least one previously-played simulation to identify successful play based on analyzing the recorded video, the successful play being based at least in part on identifying, using image analysis including at least one machine learning algorithm, implements selected and used by successful players of the at least one previously-played simulation;
    identify at least one virtual implement used in the first successful play using the image analysis; and
    present a recommendation of the implement to a second player of the computer simulation.

2. The system of claim 1, wherein the computer simulation source comprises a network server communicating with the computer simulation controller over a computer network.

3. The system of claim 1, wherein the computer simulation source comprises a computer game console communicating directly with the computer simulation controller.

4. The system of claim 1, wherein the instructions are executable to:
    identify the virtual implement at least in part using at least one machine learning algorithm processing images of the previously-played simulation.

5. The system of claim 1, wherein the instructions are executable to:
    identify the second player as being an inexperienced player in need of the recommendation at least in part using at least one machine learning algorithm processing information pertaining to the second player.

6. The system of claim 1, wherein the virtual implement comprises a virtual weapon.

7. The system of claim 1, wherein the virtual implement comprises a virtual vehicle.

8. The system of claim 1, wherein the instructions are executable to:
    recommend to the second player a hand in which to wield the virtual implement.

9. A computer-implemented method comprising:
    identifying a player of a computer simulation as requiring assistance in playing the simulation;
    analyzing recorded video of the at least one previously-played simulation using image analysis on the recorded video of the at least one previously-played simulation to identify successful play based on analyzing the recorded video, the successful play being based at least in part on identifying, using image analysis including at least one machine learning algorithm, implements selected and used by successful players of the at least one previously-played simulation; and
    responsive to identifying the player as requiring assistance and based on analyzing the recorded video to identify successful play, present on at least one audio video device at least one recommendation to the player regarding simulation play.

10. The method of claim 9, wherein the recommendation is visual.

11. The method of claim 9, wherein the recommendation is audible.

12. The method of claim 9, wherein identifying the player as requiring assistance comprises receiving a selection of inexperienced from at least one user interface (UI).

13. The method of claim 9, wherein identifying the player as requiring assistance comprises analyzing at least some simulation commands input from a simulation controller.

14. The method of claim 9, wherein the recommendation comprises a recommendation as to an implement to use.

15. The method of claim 14, wherein the implement comprises a virtual weapon.

16. The method of claim 14, wherein the implement comprises a virtual vehicle.

17. The method of claim 9, wherein the recommendation comprises at least one instruction to proceed to an emulated destination in the simulation.

18. An apparatus comprising:
    at least one computer storage that is not a transitory signal and that comprises instructions executable by at least one processor to:
    identify a player of a computer simulation as having a first characteristic;
    analyze recorded video of at least one previously-played simulation using image analysis on the recorded video of the at least one previously-played simulation to identify successful play based on analyzing the recorded video, the successful play being based at least in part on identifying, using image analysis including at least one machine learning algorithm, implements selected and used by successful players of the at least one previously-played simulation;
    responsive to identifying the player as having the first characteristic and on identifying successful play using image analysis of the recorded video, provide audio and/or video help in playing the simulation to the player using at least one display.

19. The apparatus of claim 18, wherein the first characteristic comprises inexperience in playing the computer simulation.

20. The apparatus of claim 18, wherein the audio and/or video help in playing the simulation is received from at least one machine learning (ML) model.

\* \* \* \* \*